United States Patent [19]

Orlowski

[11] 3,885,519

[45] May 27, 1975

[54] APPARATUS FOR BREADING FOOD OBJECTS

[75] Inventor: Gerald J. Orlowski, Calumet Park, Ill.

[73] Assignee: Korlow Corporation, Posen, Ill.

[22] Filed: June 4, 1973

[21] Appl. No.: 366,433

[52] U.S. Cl. .................... 118/16; 118/22; 118/24; 118/312
[51] Int. Cl. ............................................. A23g 3/20
[58] Field of Search .......... 118/16, 24, 25, 312, 18, 118/22

[56] References Cited
UNITED STATES PATENTS

| | | | |
|---|---|---|---|
| 2,119,910 | 6/1938 | Ferry ............................... | 118/16 X |
| 2,300,396 | 11/1942 | Bookidis ........................... | 118/16 |
| 2,731,942 | 1/1956 | Anderson .......................... | 118/16 |
| 3,045,640 | 7/1962 | Hill et al. .......................... | 118/16 |
| 3,536,034 | 10/1970 | Legrone ............................ | 118/16 |
| 3,547,075 | 12/1970 | Johnson ........................... | 118/24 X |
| 3,596,633 | 8/1971 | Porter et al. ....................... | 118/16 |
| 3,670,694 | 6/1972 | Vogel ............................... | 118/24 |
| 3,759,218 | 9/1973 | Korstvedt ......................... | 118/24 X |

*Primary Examiner*—John P. McIntosh
*Attorney, Agent, or Firm*—Dawson, Tilton, Fallon & Lungmus

[57] ABSTRACT

Apparatus is disclosed for breading food articles, including a machine for first applying batter to the articles. A transfer conveyor receives the articles with a batter covering, and transferring them to a main breading belt. The transfer conveyor cooperates with a formed baffle for catching and returning some of the breading to form an underlying layer on which the articles are deposited from the batter machine. Breading is applied over the articles by means of an accumulator providing two separate waterfalls spaced apart as the articles are being conveyed.

6 Claims, 14 Drawing Figures

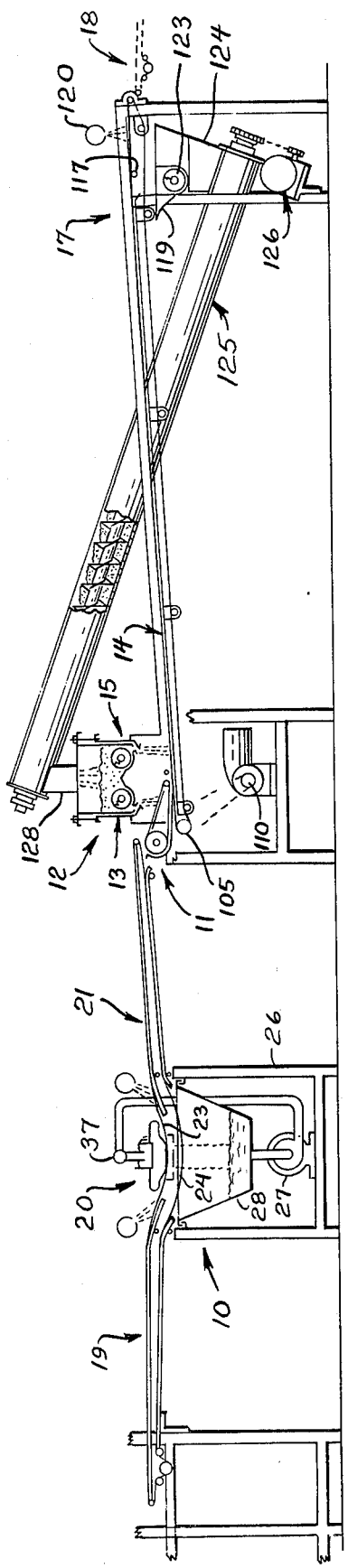
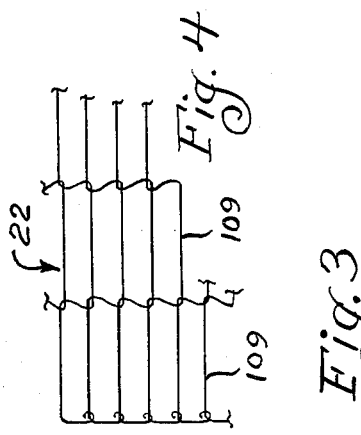
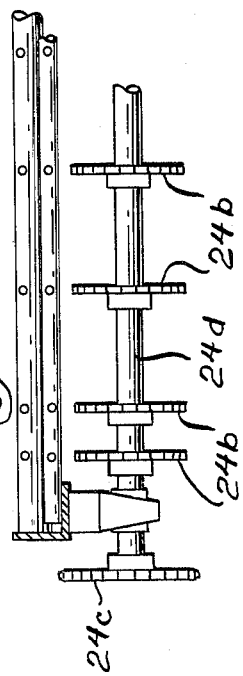
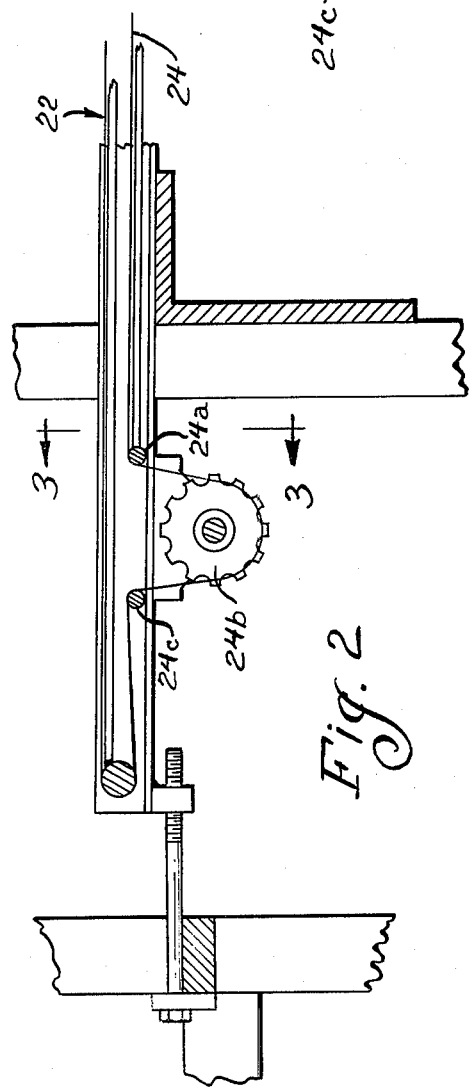
Fig. 1
Fig. 4
Fig. 3
Fig. 2

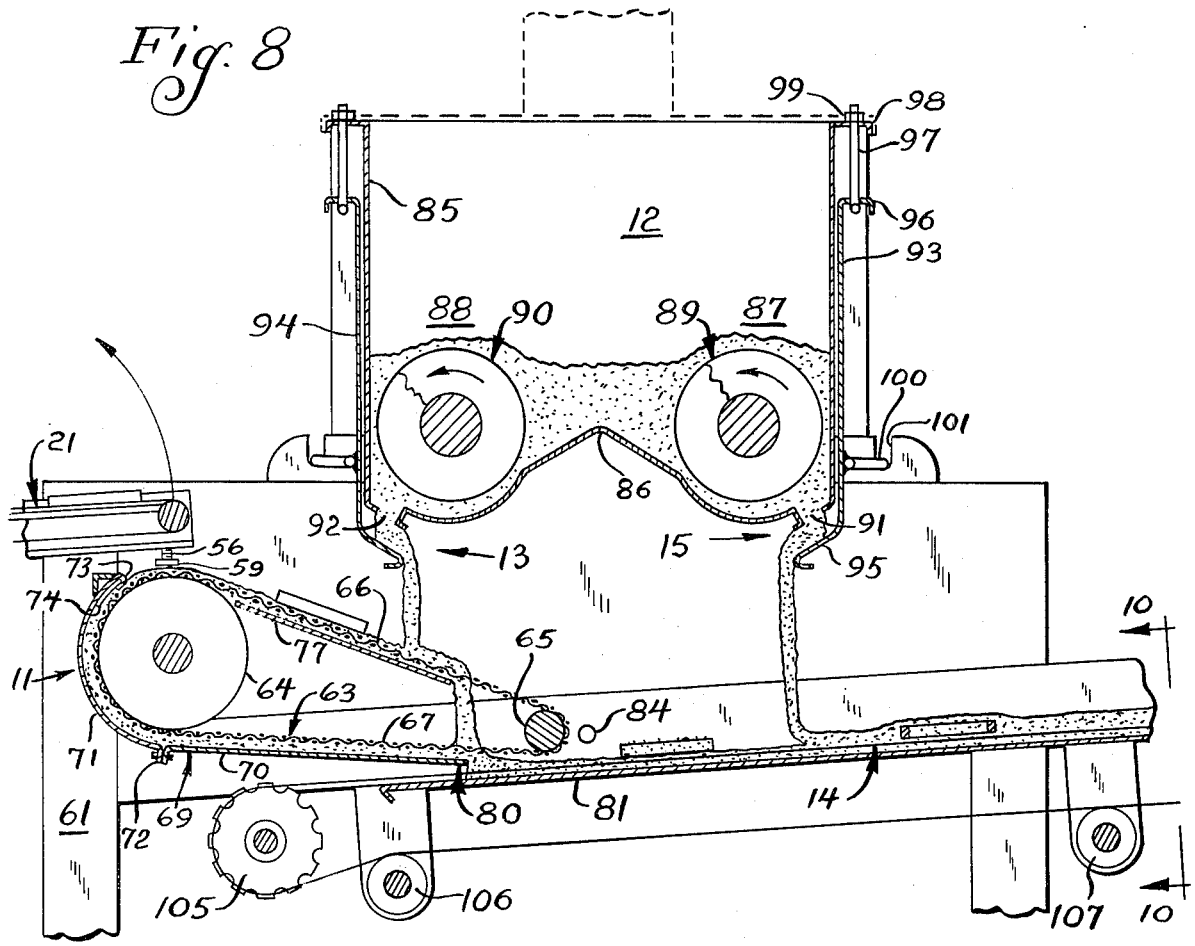
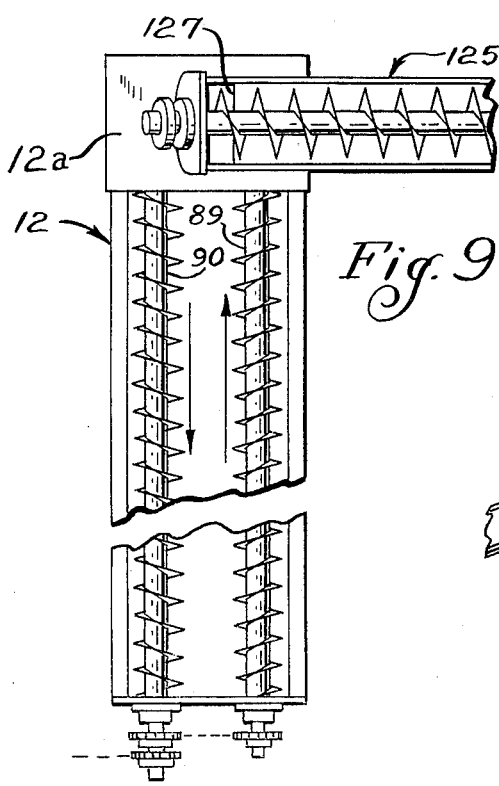
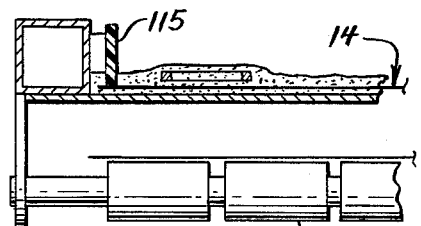
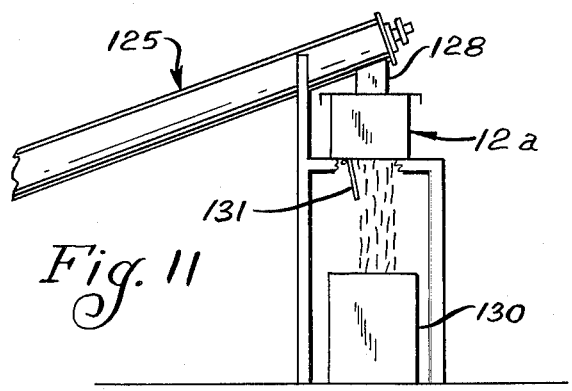

APPARATUS FOR BREADING FOOD OBJECTS

BACKGROUND AND SUMMARY

The present invention relates to the production of french-fried food articles; and more particularly, it relates to a machine which automatically applies batter and then breading to the articles, prior to cooking. The machine has other uses, however, for example, it could be used to apply flour or starch to a food article.

Machines are known for automatically breading food articles, but for the most part, these machines are cumbersome to clean, and there is difficulty in providing a uniform breading base on which to rest the articles to insure that the entire article, not just the top, is properly breaded. Further, one such known machine comprises two separate sections, each supplied on casters so that they may be moved apart for cleaning, as will be more fully explained within. This machine presents problems in alignment when it is desired to set the machine up for production, and the separate parts of the machine may come apart during operation.

The present invention includes a batter machine for applying batter to cover the articles. The articles are carried through the batter machine by means of a conveyor which deposits them onto a transfer conveyor, from which the articles are placed on the main breading conveyor. The belts on all of the conveyors are wire-mesh belts, and while each object is conveyed along the transfer conveyor, it is subjected to an overhead flow of breading material which covers it a first time. Some of this breading material falls through the transfer conveyor belt onto a baffle plate which conforms to the return run of the transfer conveyor belt. Hence, a layer of breading is returned along the baffle by means of the transfer belt and it forms a lower layer or bed of the breading material onto which the articles are deposited from the discharge end of the batter machine.

A spinning transfer roller assists in transferring the once-breaded articles from the transfer conveyor to the main breading conveyor on which the articles are placed on an even thicker bed and subjected to a second overhead flow of breading material, thereby insuring that all exposed portions of each article are fully embedded in breading material.

I have found that another problem with prior art machines for breading onion rings particularly is that insufficient time is allowed for the breading to remain in contact with the article which has been coated with batter. If the article is removed too quickly, the breading is not sufficiently wetted by the batter and has a tendency to fall off. Therefore, I have elongated the main breading conveyor to approximately seven feet which allows a much better covering. It will be appreciated that in order to achieve any significant amount of production, the minimum speed of the breading conveyor is approximately 45 feet per minute. Thus, the present system allows approximately 10 seconds of contact time between the batter and breading prior to removing the excess breading from the article.

As the articles are conveyed toward the discharge end of the main breading conveyor, they are supported by a relatively thick bed of breading. In order to avoid tipping or re-orienting the articles, the main breading conveyor belt is passed over an apertured plate through which the breading is removed in a gradual manner so that the articles are brought evenly into contact by the conveyor belt and supported thereby without tipping or catching. An eccentric roller mounted beneath the main breading conveyor belt adjacent the discharge end provides a slight vibration for removing any loose breading from the articles. The excess breading is then conveyed back to the accumulator.

Another feature of the present invention is that in the accumulator, twin augers are provided for conveying the breading from the location at which it is returned from the discharge end of the main breading conveyor and to distribute the accumulated breading evenly above the two dams which deposit the breading onto the articles, as mentioned above. These dams are located at spaced locations along the direction of movement of the article so that each article, as mentioned, is covered twice with the breading. This has been found to provide a more even final coating of the breading, and it makes the machine more reliable in that if any section of one dam becomes stopped up, the article will be covered with breading by the other dam. Each dam is further provided with a gate for adjusting the amount of breading that is released onto the articles being breaded.

Other features and advantages are disclosed which facilitate cleaning and maintenance of the machine, as will be appreciated by persons skilled in the art from the following detailed description of a preferred embodiment accompanied by the attached drawing wherein identical reference numerals will refer to like parts in the various views.

THE DRAWING

FIG. 1 is a side view of a portion of a breading assembly line incorporating the present invention;

FIG. 2 is a close-up side view, partially in cross section, of the drive system for the main breading conveyor;

FIG. 3 is an end view taken through the sight line 3—3 of FIG. 2;

FIG. 4 is a plan view of a portion of a wire conveyor belt;

FIG. 8 is a cross sectional view taken from the side of the input end of the main breading conveyor showing the transfer conveyor;

FIG. 9 is a partially broken-away plan view of the augers for distributing the breading to the dams which deposit it on the articles;

FIG. 10 is a transverse cross sectional view, partially broken away, of the main breading conveyor taken through the sight line 10—10 of FIG. 8;

FIG. 11 is a side view, partially broken away, of the return system for the breading; ;

DETAILED DESCRIPTION

Figure 5:
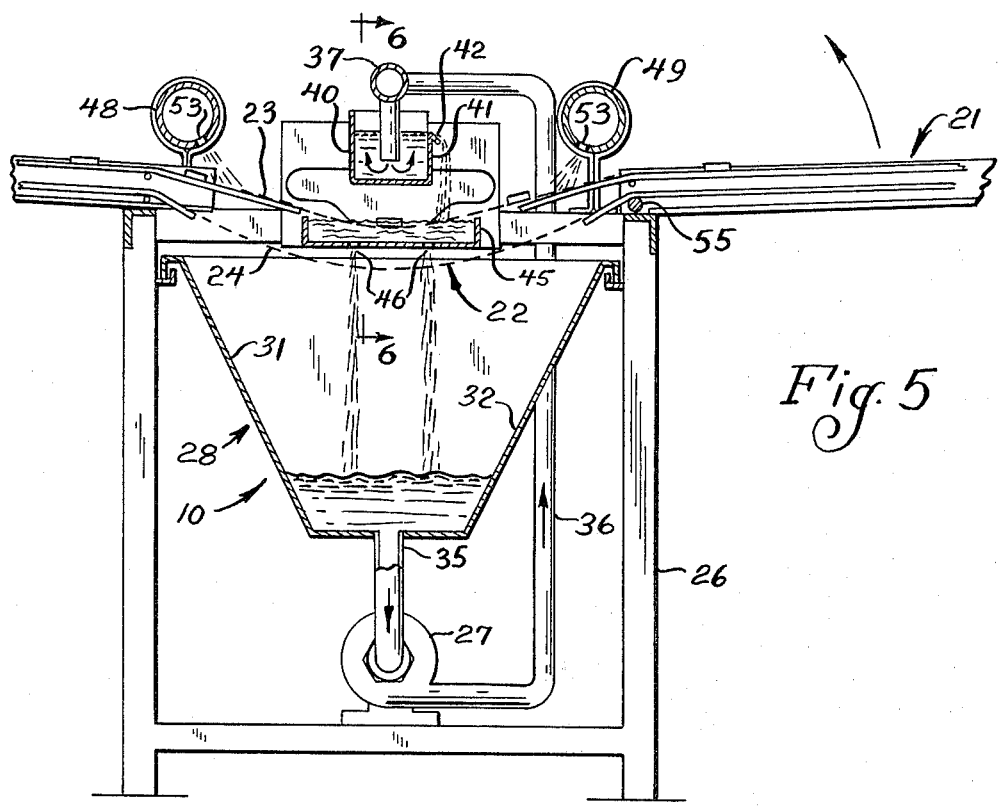
FIG. 5 is a cross sectional view, taken from the side, of the batter machine of FIG. 1.
Figure 6:
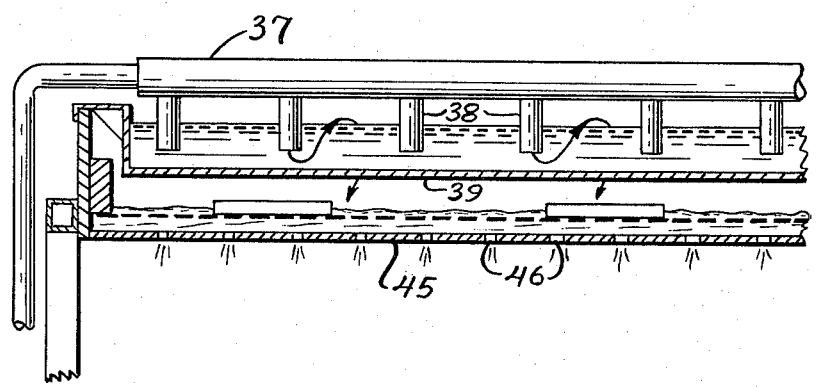
FIG. 6 is a partially broken-away cross sectional view of the batter machine.

Turning first to FIG. 1, in treating the articles being breaded, they are conveyed from left to right. Thus, out of the drawing and off to the left of the apparatus of FIG. 1 is a mechanism for forming and/or unloading food articles onto a batter machine generally designated by reference numeral 10. For example, in the case of onion rings, there may be a machine included for making the rings such as is disclosed in my copending application entitled "Apparatus for Forming Edible Rings," Ser. No. 366,432 filed June 4, 1973.

The articles are covered with batter by the batter machine 10, and they are then conveyed to a transfer conveyor generally designated 11 on which there is a moving bed of bread crumbs, according to the present invention. Reference numeral 12 generally designates a source of breading including two dams, spaced apart in the direction of movement of the articles, for depositing bread crumbs on the top of the articles as they are conveyed. The first dam generally designated 13 deposits an overhead flow of bread crumbs (or "waterfall") onto the articles while they are on the transfer conveyor 11. The articles are then placed upon a main breading conveyor 14 incuding a belt 14a and subjected to a second overhead gravity flow of bread crumbs generally designated 15.

The breaded articles then flow along the main breading conveyor 14, together with the underlying bed of breading, and the overlying layer of breading that has been deposited on top of the articles. As they travel along the main breading conveyor 14, the articles are thus completely embedded in the breading, and they are permitted to remain there for sufficient time until an even, thick layer of breading has adhered to the batter.

At the discharge end 17 of the main breading conveyor 14, excess breading is removed from the articles, and they are then deposited on a subsequent conveyor, generally designated 18 and indicated by the dashed line, for baking. The present invention relates to the application of batter, followed by the application of breading to the articles.

Turning now to FIGS. 1 and 5–7, the batter machine 10 can be seen to comprise an input conveyor, a batter-applying station 20, and a discharge conveyor 21. The conveyor system for the batter machine 10 includes a continuous wire mesh belt 22 including an upper or delivery ram 23 (see FIG. 5) and a lower or return run 24.

The batter machine 10 includes a frame 26 on which is mounted a lower pump 27 and a tank 28. The end of the frame 26 as viewed in FIG. 5 is open, and first and second angle members 29, 30 are secured to the frame 26 for slidably supporting the tank 28. The side walls of the tank 28 are tapered as at 31 and 32, and the upper edges of these side walls are flanged outwardly and downwardly as at 33 and 34 respectively to provide tongues for sliding into the channels formed by the angle irons 29, 30.

The sliding support for the batter tank 28 is considered to be an important feature of the present invention, particularly as it facilitates cleaning of the batter tank and station without having to disassemble the machine as has been the practice in machines heretofore commercially available. The lower portion of the tank 28 is provided with a discharge conduit 35 which is removably connected to the input of the pump 27 for re-circulating the batter by means of a conduit 36 in the direction of the arrows. The pump 27 forces the batter collected at the bottom of the tank 28 upwardly through the conduit 36 and into a horizontal distribution conduit 37 which is provided with a plurality of evenly spaced discharge spouts 38. The batter is thus fed into an upper trough 39 which extends transversely across the conveyor 22. The trough 39 includes an upright rear wall 40 which extends higher than a similar front wall 41. The front wall 41 is provided with an inclined ledge 42 which forms a dam over which the batter flows onto articles passing beneath it on the upper run 23 of the conveyor 22.

Located beneath the trough 39 and between the upper run 23 and return run 24 of the conveyor 22 is a dip pen 45 which catches batter overflowing the dam 42 which is not deposited on the articles being conveyed beneath the resulting gravity flow of batter. The level of batter in the dip pan 45 is adjusted so that the forward run 23 of the conveyor 22 passes through the liquid batter stored in it to coat the underside of the articles with batter. The bottom of the dip pan 45 is apertured, as best seen at 46 in FIG. 6, to permit the batter collected in it to flow into the bottom of the tank 28 for re-circulation.

FIGS. 2 aand 3 illustrate the mechanism for driving the wire conveyor belt 22 for the batter machine. The wire belt is illustrated in FIG. 4, and it will be observed from FIG. 2 that the return section thereof, 24, is passed around an idler roller 24a, a plurality of cogged drive wheels 24b (FIG. 3) and a second idler roller 24c. The drive wheels 24b are mounted on a shaft 24d, the end of which is provided with a main drive gear 24e which is rotated by means of a chain and drive motor, not shown.

Figure 7:
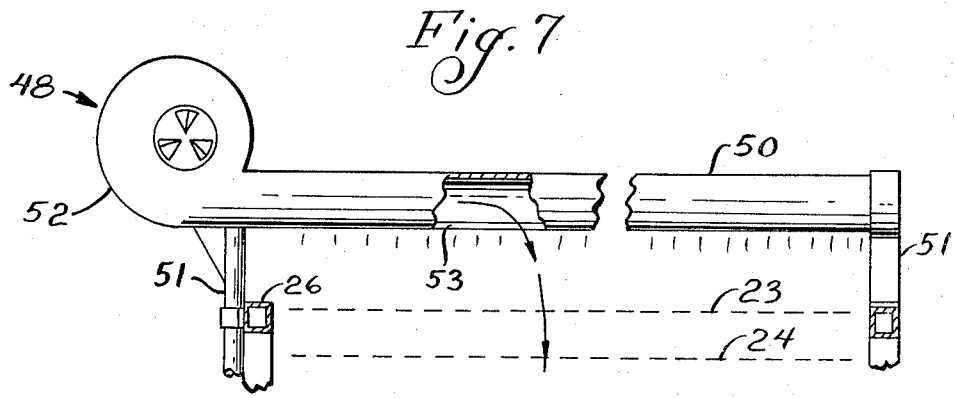
FIG. 7 is a partially broken-away end view of an air blower used in connection with the batter machine.

As best seen in FIGs. 5 and 7, on either end of the batter station, there is a source of forced air, and they are designated respectively 48 and 49. Each of the air sources 48, 49, includes a transverse discharge tube, such as the one designated by reference numeral 50 in FIG. 7 for the source 48, which is mounted by means of end clamps 51 to the frame 26 of the batter machine. A fan 52 takes atmospheric air and forces it through the conduit 50 which is provided with a discharge slot 53. The air thus flows downwardly over both the foward and return runs, 23, 24, of the conveyor belt which, as seen in FIG. 4, is a wire belt. This air thus blows any excess batter on the conveyor 22 into the collection tank 28 from which it is re-circulated.

The discharge section 21 of the conveyor associated with the batter machine 20 is pivotally connected to the frame 26 by means of a transverse shaft shown at 55 in FIG. 5, thereby permitting the distal end of the discharge section 21 to be lifted upwardly in the direction of the arrow shown at the left-hand side of FIG. 8. The discharge section of the conveyor for the batter machine is shown in a slightly raised position in FIG. 12; and it will be seen that the distal end is supported by means of a pair of bolts, one of which is shown at 56 to be threaded into a tab 57 on the frame 58 of the discharge conveyor 21. The bolt 56 rests on a pad 59 which is welded to a side wall 60 which, in turn, is supported by a frame 61 of the breading section and which also supports the transfer conveyor 11.

Figure 12:
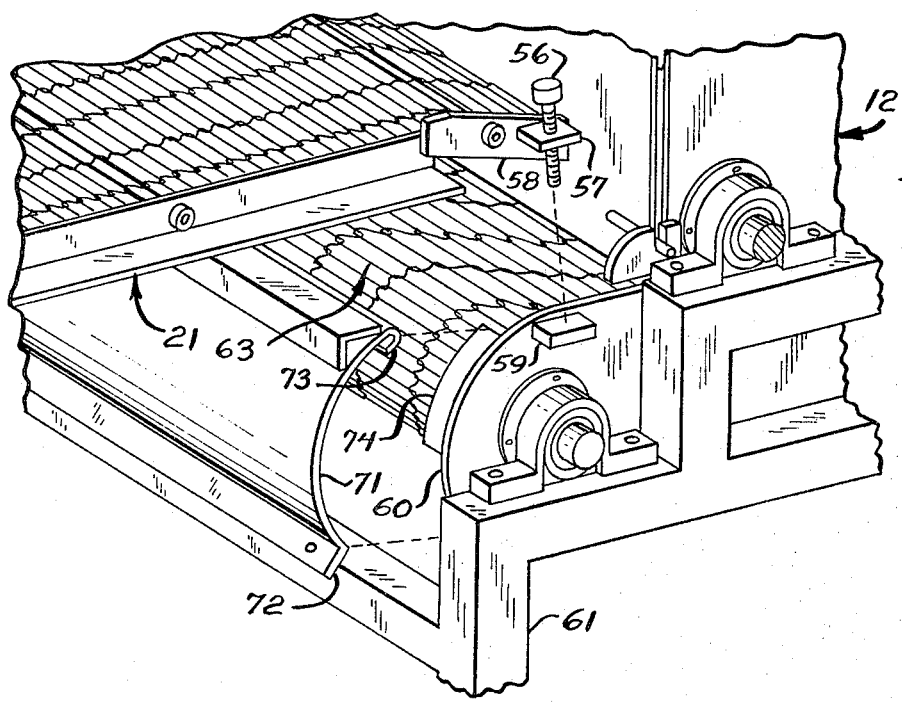
FIG. 12 is a perspective view of the input end of the main breading conveyor.

The transfer conveyor 11 includes an endless wire mesh belt 63 which is entrained around a relatively large drive roller 64 and a smaller idler roller 65. The drive roller 64 is provided with a plurality of peripheral grooves into which the bends of the wire mesh belts (which is similar to the belt 22 of FIG. 4) are received for driving the belt. Again, the transfer conveyor belt 63 includes an upper run 66 and a lower run 67. Beneath the lower run 67 and continuing about the forward (in the direction from which the articles are being conveyed) end of the larger drive roller 64, there is a metal baffle plate 69 which generally conforms to the shape of the transfer belt 63 and is spaced therefrom a predetermined distance. The baffle plate 69 includes a lower generally straight section 70 which extends beneath the return run 67 of the belt 63 and a removable curved portion 71 which is flanged as at 72 and bolted to the fixed plate 70. The upper portion of the curved baffle plate 71 is turned as at 73 so that it can be hooked over a similarly curved inner flange 74 on the frame 61. The flange 74 therefore provides support for the curved baffle plate 71 and a side overlapping so that bread crumbs are not spilled. A similar arrangement holds the other end of the curved baffle plate 71, as seen in FIG. 12.

It will be observed that the upper run 67 of the transfer conveyor is inclined downwardly toward the discharge end thereof. A plate 77 is mounted beneath the upper run 66 of the transfer conveyor 11 and spaced slightly beneath it so as not to interfere with it, but close enough to support a bed of breading which has been formed on the conveyor in a manner to be presently described.

As already explained, there are two separate waterfalls 13, 15 of breading material being deposited under gravity onto the articles from a common source of breading or accumulator 12. The first dam 13 deposits a continuous downflow of breading onto the articles as they are traveling along the upper run 66 of the transfer conveyor 11— and particularly, as they are above the inclined plate 77. Some of this material passes through the wire mesh of the transfer conveyor belt 63 and falls under gravity onto the upper surface of the lower baffle plate 70, as at 80 in FIG. 8.

Some of this material will thus be trapped between the lower run 67 of the transfer conveyor belt 63 and the correspondingly shaped baffle plate 69; and it will be conveyed leftward in FIG. 8 and, held by the curved baffle plate 71, it will be conveyed over the top of the larger roller 64 and form a continuous, uniform, relatively thick bed onto which the articles are deposited from the discharge section 21 of the batter machine conveyor. Thus, the articles, as they are fed into the breading section, land on a thick layer of breading already present. In addition, some of the breading material that does not rest on the top of the articles from the first waterfall 13 falls through the transfer conveyor entirely and onto a baseplate 81 along which the upper run of the main breading conveyor 14 travels (again, from left to right as viewed in FIG. 8).

After the articles are covered a first time with breading from the waterfall 13, they are discharged from the transfer conveyor 11 onto a spinning transfer roller 84 which is driven at the same peripheral speed as the travel speed of the main breading conveyor 14. This has been found to assist in transferring the articles to the main breading conveyor without tilting or turning and to deposit them on a bed of breading which is formed, as mentioned, by excess breading falling through the transfer conveyor belt, both from the waterfall 13 and from the previously-formed bed of the transfer conveyor which is moved along the roller 64 and inclined plate 77.

Turning now to the accumulator for the breading material, it includes a main storage bin 85 having upright walls and a bottom which is formed into a longitudinal peak as at 86 extending transverse of the direction of flow of articles. The peak 86 divides the bin 85 into a rear section 87 and a forward section 88, each equipped with a rotating auger generally designated respectively 89 and 90. Beneath each of the augers 89, 90 there is formed a continuous longitudinal slot; and these are designated respectively 91 and 92 through which the stored breading falls. Associated with each of the slots 91, 92 is a vertically movable gate, 93, 94. Each of these is similar, and only the adjustable gate 93 will be explained in further detail. The gate 93 includes a lower inclined portion 95 onto which breading material falling through the slot 91 under gravity is deflected to form the rear waterfall 15. The upper end of the gate 93 is flanged at 96 and fitted with a bolt in the form of an inverted T, designated 97. The upper end of the bolt 97 is received in a similar flange 98 formed on the upper end of the bin 85, and held there by means of a nut 99. Thus, the position of the bolt 97 may be adjusted upwardly or downwardly relatively to the fixed flange 98, and thereby close or open the gate by bringing the portion 95 closer to or further away from the slot 91. This mechanism permits adjusting the density of the waterfall 15, depending upon the coarseness of the material being used. The adjustable gate 94 operates in a similar manner; and a fixed bracket 100 received in a slot 101 limits the extent to which the gate 93 may be lowered.

The main breading belt 14a has its forward end entrained about a cogged drive wheel 105, and its upper section travels above the base 81 of the breading station. The lower or return sections of the main bedding conveyor belt are supported by means of idler rollers 106, 107 which are vertically adjustable to tension the belt, as desired. Each of the support rollers 106, 107 is best seen in FIG. 10 as including a plurality of cylindrical sections 108 which are speced apart to permit engagement with the main transverse sections of the belt and to facilitate passage of the bent wire portions of the belt which interlink these main sections, designated 109 in FIG. 4. The drive wheel 105 is driven by means of a motor designated 110 in FIG. 1.

As also seen in FIG. 10, the sides of the main breading conveyor are provided with plastic wall members 115 for containing the breading material.

Figure 13:
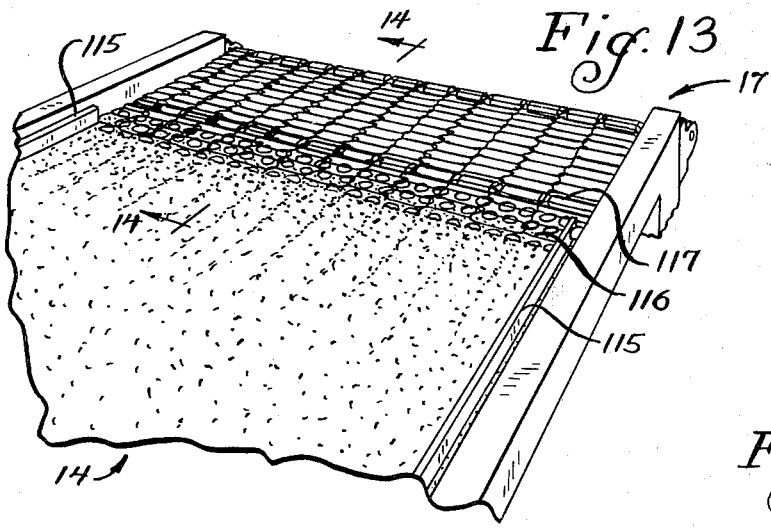
FIG. 13 is a perspective view of the discharge end of the main breading conveyor.
Figure 14:
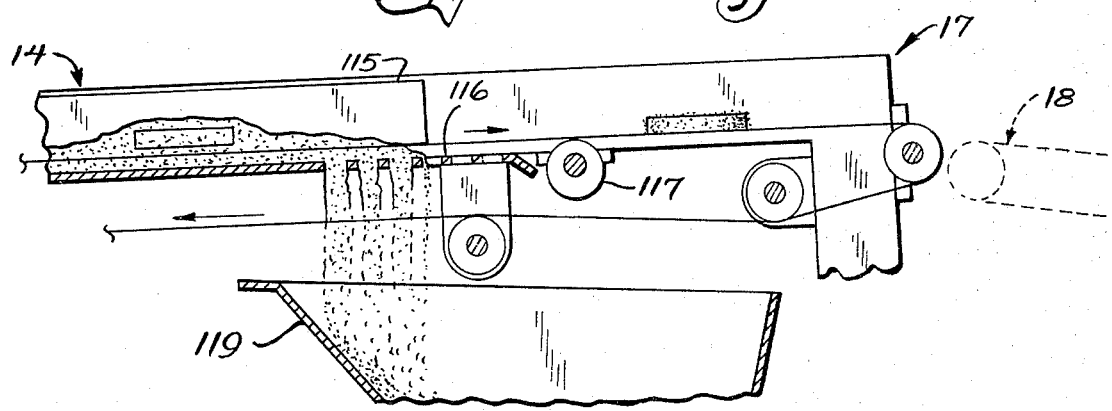
FIG. 14 is a cross sectional longitudinal view of the discharge end of the main breading conveyor.

As best seen in FIGS. 13 and 14, the discharge end of the main breading conveyor 14 includes an apertured plate 116 which is an extension of the baseplate 81 along which the reading is conveyed. The apertures in the plate 116 are staggered in the direction of travel so as to gradually diminish the height of the bed of breading on which the articles are resting, and thereby to bring the articles into full supporting engagement by the conveyor belt 14a without tilting or otherwise disorienting them. Immediately downstream of the aperture plate 116 is an eccentric roller 117, again containing cylindrical sections similar to those designated 108 in FIG. 10. This roller, which supports the conveyor belt 14a, as mentioned, is slightly eccentric so as to provide a vertical motion which shakes the excess breading from the articles and from the belt, so that the excess breading is conveyed through the apertures and the plate 116 into a collection hopper designated 119 in FIG. 1. The removal of the excess breading may be assisted by means of a downward air blower 120, similar to those discussed in connection with the batter machine and shown in FIG. 5.

From the hopper 19, the excess breading is conveyed by means of a first horizontal auger 123 to the far side of the machine, as viewed in FIG. 1. From there, the excess breading falls through a funnel 124 into the lower end of an inclined auger mechanism generally designated 125 which is driven by a motor 126 and carries the breading upward above the breading accumulator 12.

As seen in FIG. 9, there is a slot or aperture 127 at the top of the auger 125, and the breading falls through a chute 128 (FIG. 1) into the far side of the main bin 85 of the accumulator 12. As seen in FIG. 9, the two augers 89, 90, although they are rotated in the same direction, nevertheless, are provided with blades of opposite pitch. Hence, the auger 89 will convey the material in the direction of the upward arrow in FIG. 9; whereas the auger 89, when it is driven, will convey the material downward (that is, toward the observer as viewed in FIG. 8). Thus, there is provided a smooth, continuous movement of the breading material in the main accumulator bin 85 and evenly across the slots 91, 92, see also FIG. 11.

The far end of the bin 85 is provided with a downwardly opening trap door 85a in FIG. 11 beneath chute 128, so that the machine can be emptied of breading for cleaning simply by running it with the door 85a opened, and collecting all of the material from the discharge end of the inclined auger 125.

OPERATION

The operation of the above-described apparatus will be given as it relates to the breading of onion rings, realizing that different food articles and different coating materials may be employed, as discussed above.

Turning then to FIG. 1, the onion rings are deposited on the input conveyor 19 of the batter machine 10; and they are conveyed beneath the trough 39. The upper run 23 of the batter machine conveyor belts 22 sags, thereby permitting the undersurface of each of the onion rings to be coated with batter as it contacts the body of batter contained in the pan 45. The upper surface of the onion rings (see FIG. 5) is coated by batter being deposited under flow of gravity over the dam 42 associated with the trough 39.

Excess batter is blown from the wire conveyor belt by means of the blower 49 via slot 53; and batter also falls through the aperture 46 of the pan 45. The excess batter is collected by means of the tank 28 and recirculated by means of pump 27 and conduit 36 to the distribution pipe 37, from which it is forced into the reservoir formed by the trough 39 and, of course, falls over the dam 42 as already described.

For maintenance, the tank 28 may be disconnected from the pump 27 and removed from its frame 26 by sliding side-ways along the angle supports 29, 30.

As the discharge end of the batter conveyor 21, the onion rings, now covered with batter, are deposited onto a thick bed of breading material traveling along the transfer conveyor 11. This bed is formed, as mentioned, by trapping breading material beneath the return run of the transfer conveyor belt 63, and moving it along the baffle 69 over the top of the drive roller 64 and onto the inclined support plate 77.

Thus sitting on a bed of breading material, the onion rings are conveyed beneath a first waterfall 13 which deposits an even layer of burning material to cover the entire upper surfaces of the onion rings.

Referring now to FIG. 8, as the articles and breading exit from the transfer conveyor, they are supported and assisted by the spinning roller 84 onto a secondary bed of breading which is formed beneath the idler roll 65 as excess breading falls through the upper and lower runs of 66 and 67 of the transfer conveyor. Some of the breading, as mentioned, does not fall through the lower run, but rather is gathered at the location 80 on the baffle plate 70, and it is conveyed along the curved baffle plate by the return run of the transfer conveyor, thereby to provide a bed of breading for the articles as they are deposited onto the transfer conveyor.

As the articles travel along the main breading conveyor, they are moved beneath a second flow of breading from the source 12. The use of two waterfalls of breading has been found useful not only to provide a better covering of breading for the articles, but also, in the case that something becomes lodged in one of the dams, to insure that all exposed portions of the articles will be contacted by a breading waterfall at least one time. Further, by using the auger distribution mechanism disclosed, including the augers 89 and 90 rotating in the same direction but having opposite pitches, more evenly distributes the breading material and insures that as long as breading is being supplied to the accumulator 12, it will be evenly distributed along the slots 91, 92.

The speed of the main breading conveyor belt 14a is approximately 45 feet per second, and it has a total length of approximately 7 feet from the point at which the articles are deposited on it to the point of discharge. This is about twice as long as conventional breading conveyors, and I have found that it greatly enhances the final product because additional time is given in which to have the breading material adhere to the batter.

At the discharge end of the main breading conveyor, the articles and breading pass over the apertured plate 116 of FIG. 13, and the excess breading is very gradually removed until the articles are in full supporting engagement with the main breading conveyor belt. Further, the main breading conveyor belt is shaken in a vertical direction by the eccentric roller 117 to further assist in removing excess breading. The excess breading is then returned by means of the transverse auger 123 and inclined auger 125 to the accumulator 112.

Having thus described in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications, and substitutions be covered as they are embraced within the spirit and scope of the appended claims.

I claim:

1. Apparatus for applying particulate matter to articles of food, comprising: conveyor means conveying said articles and including a first conveyor belt having a forward run and a return run; baffle means conforming to and partially surrounding said return run of said first belt and adapted to collect some of said particulate matter, said return run of said first conveyor belt moving said material collected by said baffle means to the input end of the forward run of said first conveyor belt to provide a bed of said particulate matter for articles deposited thereon; a source of said particulate matter above said conveyor means including an accumulator bin defining first and second elongated slots spaced respectively upstream and downstream and each extending across said conveyor means; first and second augers rotatably mounted within said bin and located respectively above said first and second discharge slots, each of said augers conveying matter in said accumulator bin in an opposite direction relative to the direction of elongation of said slots, means for driving said augers to evenly distribute said material throughout said bin and across said slots; and means for collecting said particulate matter not adhered to said articles downstream of said first slot and returning the collected material to said bin for recirculating the same.

2. The apparatus of claim 1 further comprising first and second adjustable gates carried by said bin and mounted respectively adjacent said first and second slots for measuring the amount of material flowing through its associated slot.

3. The apparatus of claim 1 wherein said first and second augers in said bin each extend substantially the entire length of its associated discharge slot, and wherein the flights on said augers are arranged in opposite pitches, said means for driving said augers being arranged to rotate said augers in the same angular direction, whereby said particulate matter will be conveyed in opposite directions by said augers.

4. The apparatus of claim 1 wherein said particulate matter is breading, and wherein said conveyor means further includes a support plate located directly beneath said forward run thereof to receive and support said bed of breading thereon as said articles pass thereover.

5. The apparatus of claim 1 wherein said first conveyor belt comprises a transfer conveyor belt providing said forward run and said return run, and further including a second conveyor receiving said articles from said transfer conveyor for transporting the same to the discharge end of said apparatus.

6. The apparatus of claim 5 wherein said second conveyor further includes an apertured plate adjacent the discharge end thereof to gradually remove excess breading material from said articles; and shaker means for shaking said conveyor belt of said second conveyor to assist in removing said breading from said belt and from said articles.

* * * * *